(No Model.)

C. E. ALBRIGHT.
VEHICLE SPRING RELIEVER.

No. 346,342. Patented July 27, 1886.

WITNESSES:
J. C. Turner
B. W. Sommers

INVENTOR:
Chester E. Albright
by Doubleday & Bliss
att'ys

UNITED STATES PATENT OFFICE.

CHESTER E. ALBRIGHT, OF MUNCY, PENNSYLVANIA.

VEHICLE-SPRING RELIEVER.

SPECIFICATION forming part of Letters Patent No. 346,342, dated July 27, 1886.

Application filed October 13, 1883. Serial No. 108,924. (No model.)

*To all whom it may concern:*

Be it known that I, CHESTER E. ALBRIGHT, a citizen of the United States, residing at Muncy, in the county of Lycoming and State of Pennsylvania, have invented certain new and useful Improvements in Vehicle-Spring Relievers, of which the following is a specification, reference being had therein to the accompanying drawings.

Figure 1:
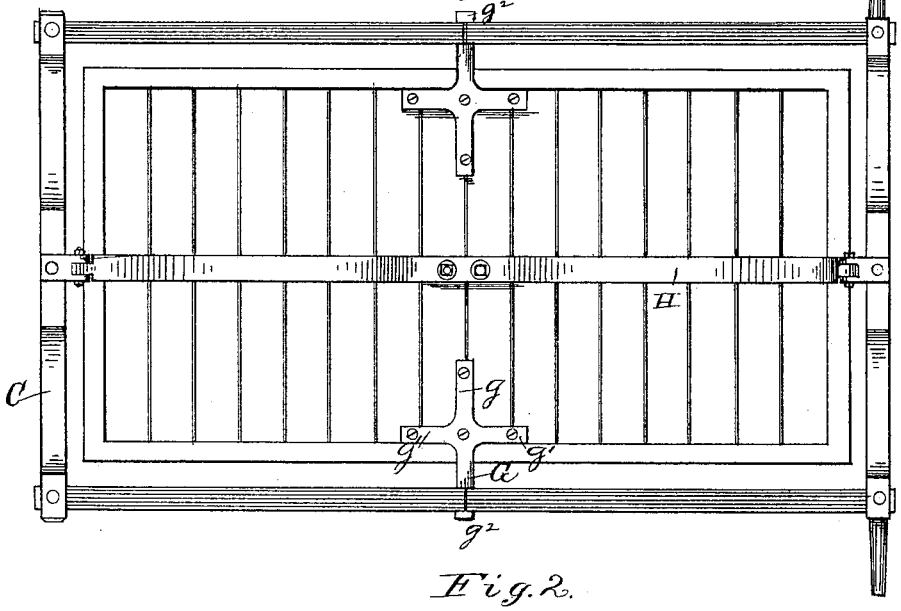
Figure 2:
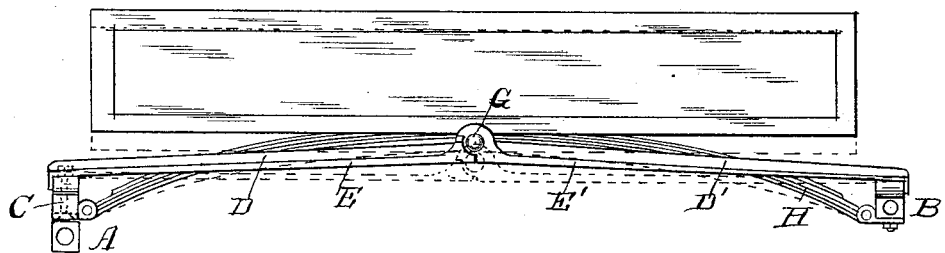
Figure 3:
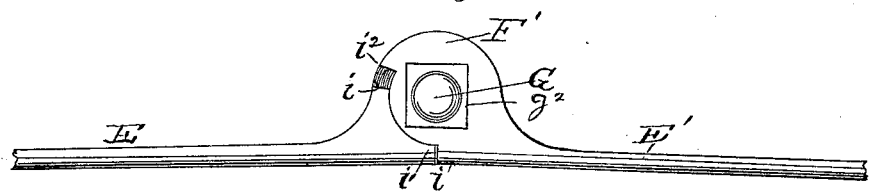
Figure 4:
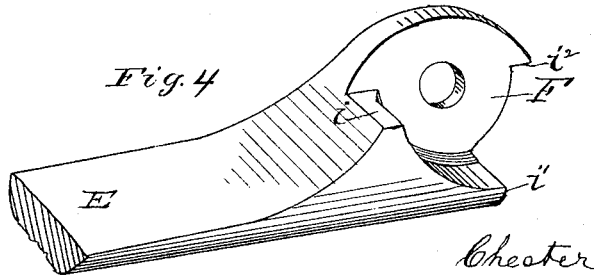

Figure 1 is a bottom plan view of a portion of a vehicle embodying my improvements. Fig. 2 is a side elevation. Fig. 3 is a side view of the hinge on a larger scale. Fig. 4 is a perspective of a part of the hinge.

In the drawings I have shown a running-gear of one of the forms adapted to have my improvements applied thereto.

A represents the front axle, B the rear axle, and C the bolster, which is pivotally mounted upon the front axle, A, these parts being constructed in any of the ordinary ways or in any preferred manner.

H represents a semi-elliptical spring, secured by shackles or otherwise to the rear axle, B, and to the bolster C. As shown, this spring is situated upon the central longitudinal line of the body, and is secured to the bottom of the latter or to a bar thereunder by bolts, or in any other suitable way.

A single spring, and that a light one, can be used, if the other parts of the running-gear be so constructed as that the spring be relieved of all unnecessary work and shall have nothing to do but receive the weight on vertical lines, and be relieved of all improper and unnecessary strain. To thus relieve the spring I combine with it devices constructed and arranged as follows: Upon each side of the vehicle there are spring-relieving bars D D', which, while being constructed and operating very differently from the side bars now ordinarily used, yet may be so arranged as to have very much the appearance of such bars. Each of these spring-relievers D D' is secured pivotally to the body, the pivots being situated, preferably, on about the central transverse line. The part D of the reliever extends from the pivot to the bolster C, and the part D' from the pivot to the rear axle, B, they being respectively secured by clips, or in any other suitable way. The inner ends of these parts of the reliever are hinged together by a pivotal joint, the parts of the joint being preferably respectively formed on the ends of the two metallic bars E E', one secured to the under side of the part D and the other to the part D'.

One portion of the hinge proper is constructed with a hinge plate or ear, F, and the other with a corresponding plate or ear, F'. Preferably, these plates or ears are about one-half of the width of the metal bars E E', so that when joined together the faces of the joint or hinge shall be flush with the faces of the metal bars.

G represents the pivot or pivotal joint which joins the hinge plates or ears together. It is rigidly fastened to the body by means of an inwardly-extending arm, $g$, and two or more lateral arms, $g'$, adapted to be bolted to the under side of the body. The pivot portion G may be provided with a nut or other fastening device at $g^2$, for clamping the hinge-plates of the joint thereon.

It will be seen that the body, when thus mounted and supported, will be permitted to rise and fall freely upon the spring H, for the spring-relievers D D' at the sides, although connected with the body, yet allow it to rise and fall by reason of the hinge-connection. It will be further seen that the spring is entirely relieved of any strain which is experienced by the springs of vehicles as heretofore constructed. As usually made, they have the parts so related and joined that the body is constantly tending to strain the springs and their fastenings, it being supported in such way that its longitudinal motion, either forward or back, is transmitted immediately to the springs and their fastening devices, and so, also, are its lateral or sidewise motion and the twisting or centrifugal motions.

In my construction the spring is relieved of all this—that is to say, none of the motions of the body, either longitudinal or transverse, are transmitted to the spring, all being received by the rigid and stronger parts of the gear. If the body should, by reason of its momentum, tend to move forward relatively to the wheel, its forward motion is instantly caught by the forward parts, D, of the spring-relievers, and if it should tend to move rearward the motion is caught by the rear parts, D'.

Each portion of the plate or hinge above described which joins the inner ends of the parts D D' is formed with three shoulders, $i$ $i'$ $i^2$. When the two parts of the hinge are put together, the shoulders of one abut against those of the other at proper times to prevent the body from moving too far up or down, the motion, as will be seen, being thus limited in both directions.

What I claim is—

1. The herein-described joint for hinging the inner ends of the parts D D' of the spring-reliever together and to the body, it having the opposing hinge plates or ears F F', provided with a knuckle, which limits the downward motion of the body, and arranged to have the axis between the ends of the bars, said axis being secured to the body directly, substantially as set forth.

2. The herein-described joint for hinging the inner ends of the parts D D' of the spring-reliever together and to the body, it having opposing hinge plates or ears, each provided with two knuckles, one limiting the downward motion of the body and the other limiting the upward motion, and one being above and the other below the hinge-axis, substantially as set forth.

3. The combination of the rear axle and the front bolster or other parts of the running-gear, the spring secured to said parts of the running-gear on the central longitudinal line of the vehicle and secured to the bottom of the body, the spring-reliever having the parts D D' secured at their outer ends to the axles or other parts of the running-gear, and the knuckle-joint at the inner ends of the side levers or bars provided with stops to limit the upward play, substantially as set forth.

4. A running-gear for vehicles, having a spring-reliever consisting of two opposing hinge-plates placed side by side parallel with the longitudinal line of the vehicle, said plates being formed with laterally-projecting parts $i'$, and each having a knuckle to limit the play of the vehicle-body, substantially as set forth.

5. In a spring-reliever for a vehicle running-gear, the combination of the two bars at the side of the body and the metallic connecting-pieces having hinged plates arranged side by side parallel with the body, and having parti-circular shoulders projecting laterally from said plates, as shown in Fig. 4, substantially as set forth.

6. A hinge-connecting piece having an aperture for the axis or pintle, a plate transverse to said axis, a parti-circular shoulder concentric with said axis, and a stop, $i$, substantially as set forth.

7. The herein-described connecting-pieces adapted to serve as a hinge, each having a plate transverse to the axis formed with a shoulder, $i^2$, and a parti-circular concave projection extending laterally from said plate and formed with a shoulder, $i$, whereby motion around the hinge can be limited, substantially as described.

8. The combination of the body, the single central spring arranged longitudinally, and the spring-reliever, substantially as set forth.

In testimony whereof I affix my signature in presence of two witnesses.

CHESTER E. ALBRIGHT.

Witnesses:
D. W. BUFFINGTON,
DE LA GREEN.